United States Patent
Kida et al.

(10) Patent No.: US 9,112,342 B2
(45) Date of Patent: Aug. 18, 2015

(54) POWER FEEDING WIRING STRUCTURE

(75) Inventors: Yuuji Kida, Yokkaichi (JP); Ryouichi Mitsuda, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 394 days.

(21) Appl. No.: 13/634,171

(22) PCT Filed: Oct. 7, 2010

(86) PCT No.: PCT/JP2010/067656
§ 371 (c)(1),
(2), (4) Date: Sep. 11, 2012

(87) PCT Pub. No.: WO2011/114560
PCT Pub. Date: Sep. 22, 2011

(65) Prior Publication Data
US 2013/0001374 A1 Jan. 3, 2013

(30) Foreign Application Priority Data
Mar. 16, 2010 (JP) .................. 2010-059335

(51) Int. Cl.
*E05F 11/00* (2006.01)
*H02G 11/00* (2006.01)
(Continued)

(52) U.S. Cl.
CPC .............. *H02G 11/00* (2013.01); *B60R 16/027* (2013.01); *B60R 16/0215* (2013.01); *H02G 3/0481* (2013.01)

(58) Field of Classification Search
CPC . H02G 3/0481; B60R 16/027; B60R 16/0215
USPC .............................. 49/360; 296/155
See application file for complete search history.

(56) References Cited

U.S. PATENT DOCUMENTS 6,079,764 A 6/2000 Suzuki et al.
6,575,760 B2 * 6/2003 Doshita et al. .................. 439/34
(Continued)

FOREIGN PATENT DOCUMENTS

EP 1736368 12/2006
JP 2002127844 5/2002
(Continued)

OTHER PUBLICATIONS

International Preliminary Report on Patentability.
(Continued)

*Primary Examiner* — Jerry Redman
(74) *Attorney, Agent, or Firm* — Gerald E. Hespos; Michael J. Porco; Matthew T. Hespos

(57) ABSTRACT

A power feeding wiring structure includes a protection tube for wires, a slide door side fixing device adapted to fix one end of the protection tube, and a vehicle body side fixing device adapted to fix the other end of the protection tube. The slide door side fixing device includes a restricting portion for restricting a moving range of the protection tube by being pivoted about a rotary shaft, and a biasing portion for rotating the restricting portion in a biasing direction. A center line along a length direction of the restricting portion is located in an area at a front side in the biasing direction with respect to a first plane defined by the position of a leading end of the restricting portion and the rotary shaft, whereby the leading end of the restricting portion projects out from the slide door when the slide door is opened and closed.

7 Claims, 6 Drawing Sheets

(51) Int. Cl.
*B60R 16/02* (2006.01)
*B60R 16/027* (2006.01)
*H02G 3/04* (2006.01)

(56) References Cited

U.S. PATENT DOCUMENTS

| | | | |
|---|---|---|---|
| 6,724,613 B2* | 4/2004 | Doshita et al. | 307/10.1 |
| 7,530,825 B2* | 5/2009 | Sato et al. | 439/162 |
| 8,227,693 B2* | 7/2012 | Katou et al. | 174/72 A |
| 8,237,053 B2* | 8/2012 | Katou et al. | 174/72 A |
| 8,242,366 B2* | 8/2012 | Katou et al. | 174/72 A |
| 8,324,501 B2* | 12/2012 | Terada et al. | 174/72 A |
| 2003/0184118 A1* | 10/2003 | Sano et al. | 296/155 |
| 2007/0125001 A1 | 6/2007 | Choi | |
| 2008/0035799 A1* | 2/2008 | Yamamoto et al. | 248/49 |
| 2008/0035800 A1* | 2/2008 | Yamamoto | 248/70 |
| 2008/0128232 A1* | 6/2008 | Aoki et al. | 191/22 R |
| 2008/0210828 A1* | 9/2008 | Kogure et al. | 248/65 |
| 2009/0095858 A1* | 4/2009 | Katou et al. | 248/205.1 |
| 2009/0223132 A1* | 9/2009 | Aoki et al. | 49/360 |

FOREIGN PATENT DOCUMENTS

| | | |
|---|---|---|
| JP | 2004-357360 | 12/2004 |
| JP | 2008-220013 | 9/2008 |
| JP | 2010-23757 | 2/2010 |
| WO | 2010010755 | 1/2010 |

OTHER PUBLICATIONS

Korean Office Action.
Japanese Office Action.
Chinese Patent Application No. 201080065417.6—Office Action.
Extended European Search Report.
Korean Office Action—May 1, 2014.
Chinesese Appl. No. 2010 800 65 417.6—Chinese Office Action issued Apr. 14, 2015.
European Office Action dated Apr. 28, 2015.

* cited by examiner

F I G. 4
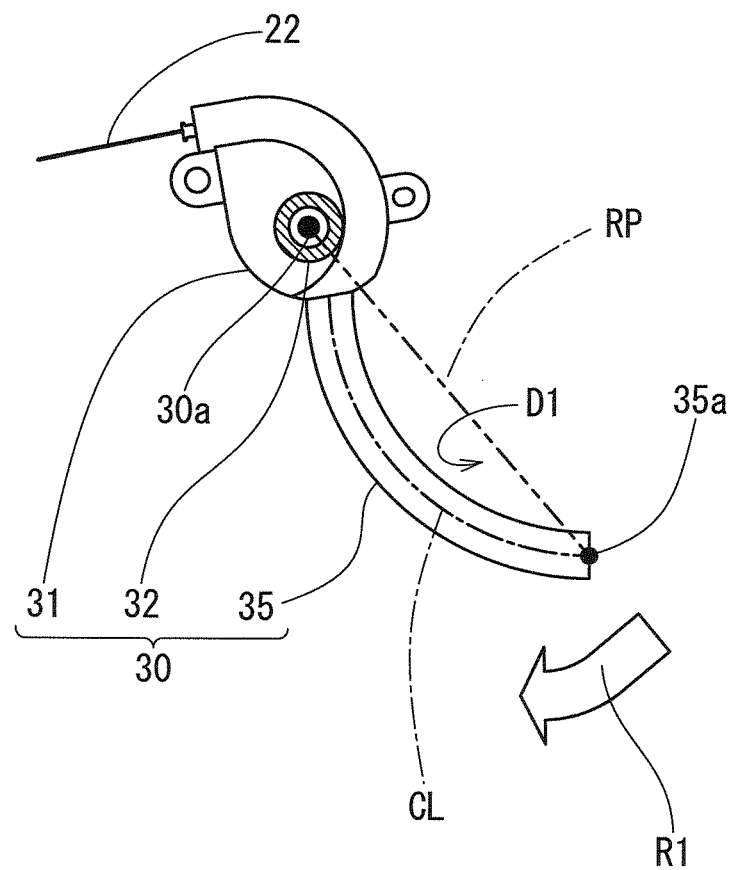

POWER FEEDING WIRING STRUCTURE

BACKGROUND OF THE INVENTION

1. Field of the Invention

The present invention relates to a power feeding wiring structure for arranging a plurality of wires between a slide door and a vehicle body.

2. Description of the Related Art

Conventionally, there is known a technology for suppressing the hang-down of a wiring harness arranged between a vehicle body and a slide door when the slide door is opened (for example, Japanese Unexamined Patent Publication No. 2010-023757).

In the technology of Japanese Unexamined Patent Publication No. 2010-023757, the wiring harness is covered by a corrugated tube. Further, a part of the corrugated tube arranged in the slide door is guided by a rotary body of a mounting device.

As a result, there arises a problem that a part of the corrugated tube arranged in the slide door, which part is not guided by the rotary body of the mounting device, interferes with the slide door depending on a mounting state of the mounting device.

Accordingly, the present invention aims to provide a power feeding wiring structure capable of achieving satisfactory opening and closing movements of a slide door.

SUMMARY OF THE INVENTION

In order to solve the above problem, a first aspect is directed to a power feeding wiring structure, comprising a protection tube; a plurality of wires arranged in the protection tube; a slide door side fixing device provided on a slide door and adapted to fix one end of the protection tube; and a vehicle body side fixing device provided on a vehicle body and adapted to fix the other end of the protection tube; wherein the slide door side fixing device includes a base portion fixed in the slide door with the protection tube arranged inside, a restricting portion for restricting a moving range of the protection tube near the slide door by being pivoted about a rotary shaft relative to the base portion with the protection tube arranged inside, and a biasing portion for rotating the restricting portion in a biasing direction by accumulated elastic energy; and a center line along a length direction of the restricting portion is located in an area at a front side in the biasing direction with respect to a first plane defined by the position of a leading end of the restricting portion and the rotary shaft, whereby the leading end of the restricting portion projects out from the slide door when the slide door is opened and closed.

According to a second aspect, when a second plane is defined as a plane normal to the rotary shaft, a cross-section of the restricting portion cut by the second plane is arched in the power feeding wiring structure according to the first aspect.

According to a third aspect, the center line of the restricting portion is arcuate in the power feeding wiring structure according to the first aspect.

According to a fourth aspect, the restricting portion receives a tensile force from the protection tube by a closing movement of the slide door, whereby the elastic energy corresponding to the tensile force is accumulated in the biasing portion in the power feeding wiring structure according to any one of the first to third aspects.

According to the power feeding wiring structure of the first to fourth aspects, the center line along the length direction of the restricting portion is located in the area at the front side in the biasing direction with respect to the first plane defined by the position of the leading end of the restricting portion and the rotary shaft, and the leading end of the restricting portion projects out from the slide door when the slide door is opened and closed. Thus, the interference of the slide door and the protection tube can be prevented when the slide door is opened and closed.

BRIEF DESCRIPTION OF DRAWINGS

FIG. 4 is a side view showing an example of the configuration of a restricting portion.

DETAILED DESCRIPTION OF THE PREFERRED EMBODIMENT

Hereinafter, an embodiment of the present invention is described in detail with reference to the drawings.

<1. Configurations of Automotive Vehicle and Slide Door>

Figure 1:
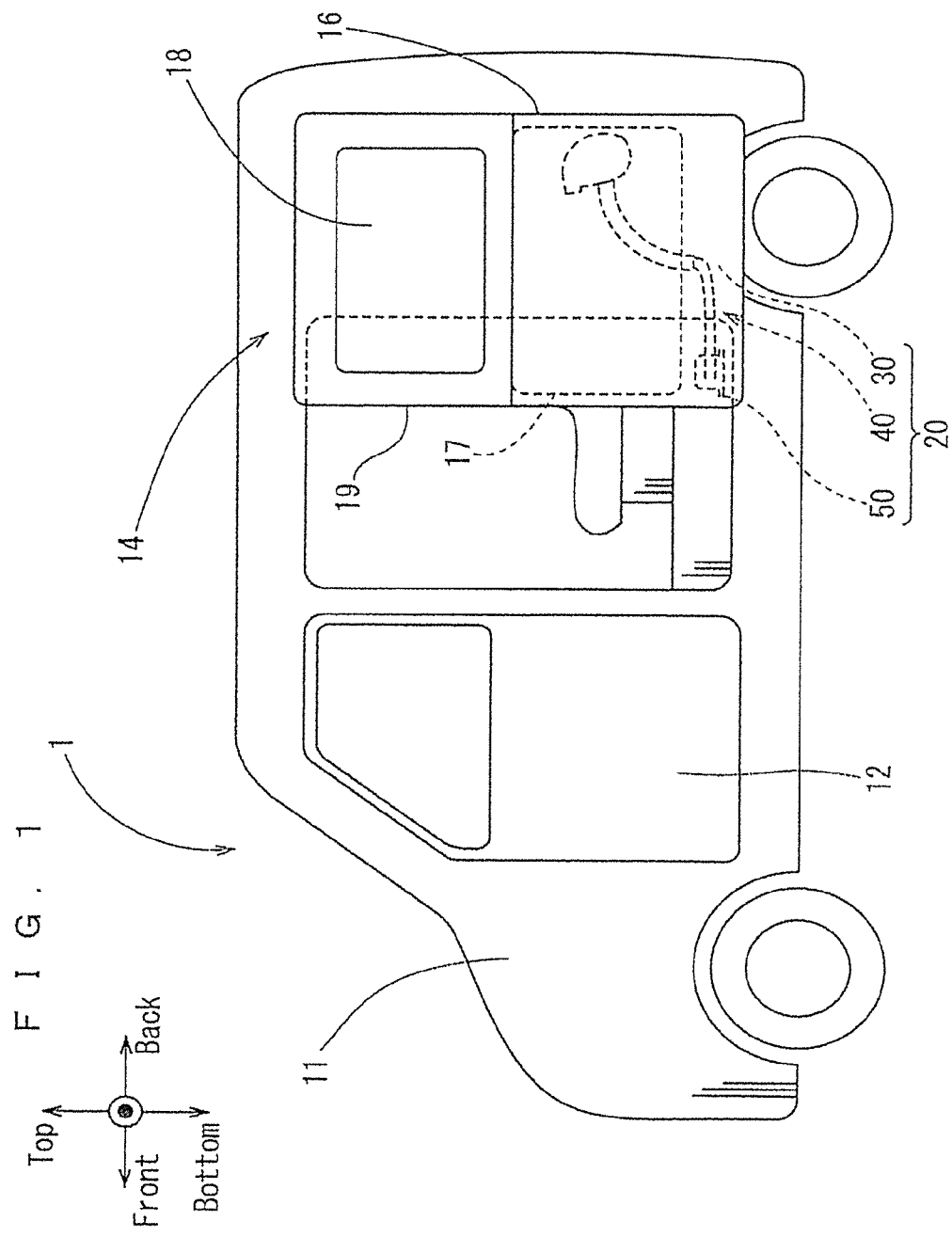
FIG. 1 is a side view showing an example of the overall configuration of an automotive vehicle in an embodiment of the present invention, as viewed from the left side of the vehicle.

FIG. 1 is a side view showing an example of the overall configuration of an automotive vehicle 1 in an embodiment of the present invention. As shown in FIG. 1, the automotive vehicle 1 mainly includes a substantially box-shaped vehicle body 11, front doors 12 and a slide door 14 and is used as a passenger vehicle or a truck. Note that coordinate axes indicating forward and backward directions, lateral direction and vertical direction are attached to FIG. 1 and subsequent Figures to clarify a directional relationship thereof as needed.

The front doors 12 are hinged opening doors and provided on both left and right side surfaces of the vehicle body 11. Further, the slide door 14 is an opening door which moves back and forth along a desired opening path. As shown in FIG. 1, the slide door 14 mainly includes an outer panel 16 made of metal, an inner panel 17 made of resin, a window pane 18 and a window frame 19 provided in upper parts of the outer panel 16 and the inner panel 17.

Although the slide door 14 is provided only on the left side surface of the vehicle body 11 here in FIG. 1, the arrangement of the slide door 14 is not limited to this. For example, the slide door 14 may be provided on either one of the left and right side surfaces or may be provided on each of the left and right side surfaces. Further, opening doors which move back and forth may be used as the front doors 12 instead of the hinged opening doors.

<2. Configuration of Power Feeding Wiring Structure>

Figure 2:
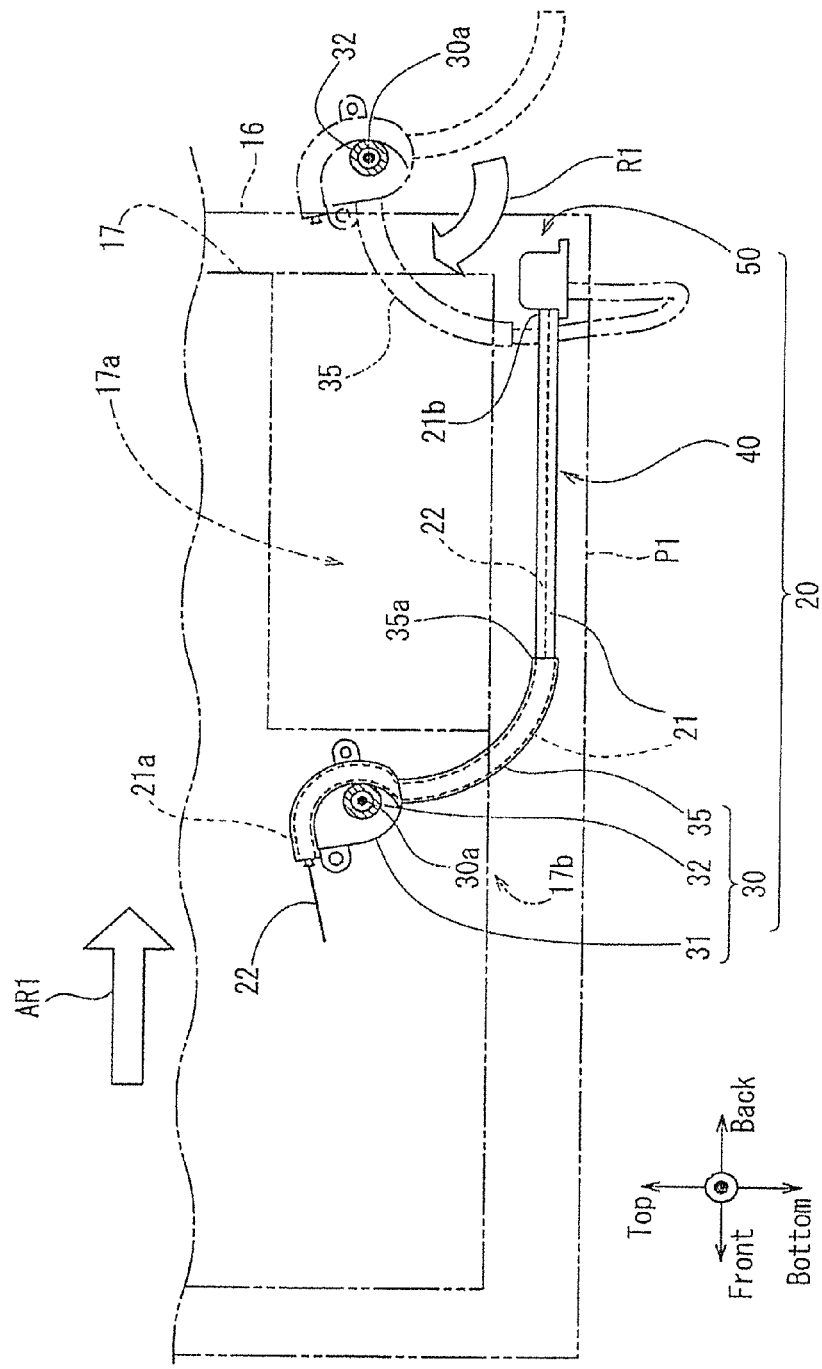
FIG. 2 is a side view showing an example of a power feeding wiring structure, as viewed from the left side of the vehicle.
Figure 3:
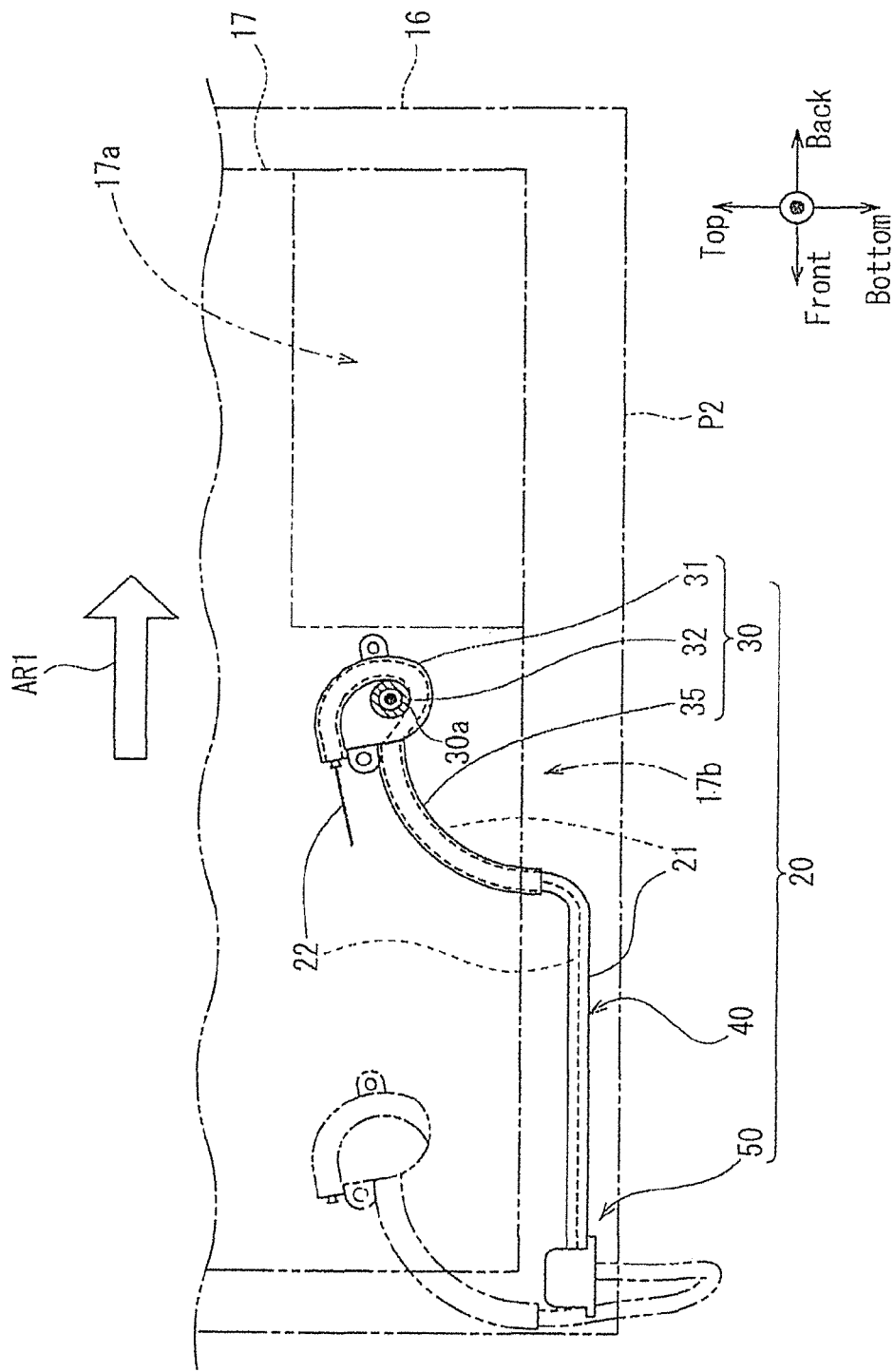
FIG. 3 is a side view showing the example of the power feeding wiring structure, as viewed from the left side of the vehicle.

FIGS. 2 and 3 are respectively side views showing an example of a power feeding wiring structure 20 at a closed position P1 and an open position P2 of the slide door 14. The power feeding wiring structure 20 prevents an excessive load from being applied to a wiring harness 22 without hindering forward and backward movements of the slide door 14. As shown in FIGS. 2 and 3, the power feeding wiring structure 20 mainly includes a slide door side fixing device 30, a linking portion 40 and a vehicle body side fixing device 50.

As shown in FIGS. 2 and 3, the slide door side fixing device 30 is provided at a desired position of the slide door 14 (more specifically, fixed at the desired position of the slide door 14).

Electrical components (not shown) provided in the slide door 14 include, for example, a motor for power windows and a switch for opening and closing the power windows. These unillustrated electrical components may be, for example, mounted in a mounting area 17*a* enclosed by the outer and inner panels 16, 17. Note that detailed hardware configuration of the slide door side fixing device 30 is described later.

The linking portion 40 is arranged between the vehicle body 11 and the slide door 14 and electrically connects the slide door side fixing device 30 and the vehicle body side fixing device 50. In this embodiment, the linking portion 40 is formed by a wire protection tube 21 and the wiring harness 22 as shown in FIGS. 2 and 3.

Here, the wire protection tube 21 is a flexible and substantially cylindrical resin tube. For example, a corrugated tube is used as the wire protection tube 21. The wiring harness 22 is composed of a plurality of wires arranged in the wire protection tube 21 and electrically connects the vehicle body 11 and the slide door 14.

As shown in FIGS. 2 and 3, the vehicle body side fixing device 50 is provided at a desired position of the vehicle body 11 (more specifically, fixed at the desired position of the vehicle body 11).

Note that although another end 21*b* of the wire protection tube 21 is arranged in the vehicle body side fixing device 50 as shown in FIGS. 2 and 3, there is no limitation to this. For example, the wire protection tube 21 may be fixed to the vehicle body side fixing device 50 with the other end 21*b* arranged outside the vehicle body side fixing device 50. That is, the vehicle body side fixing device 50 fixes the other end 21*b* side (vicinity of the other end 21*b*) of the wire protection tube 21.

<3. Configuration of Slide Door Side Fixing Device>

Figure 5:
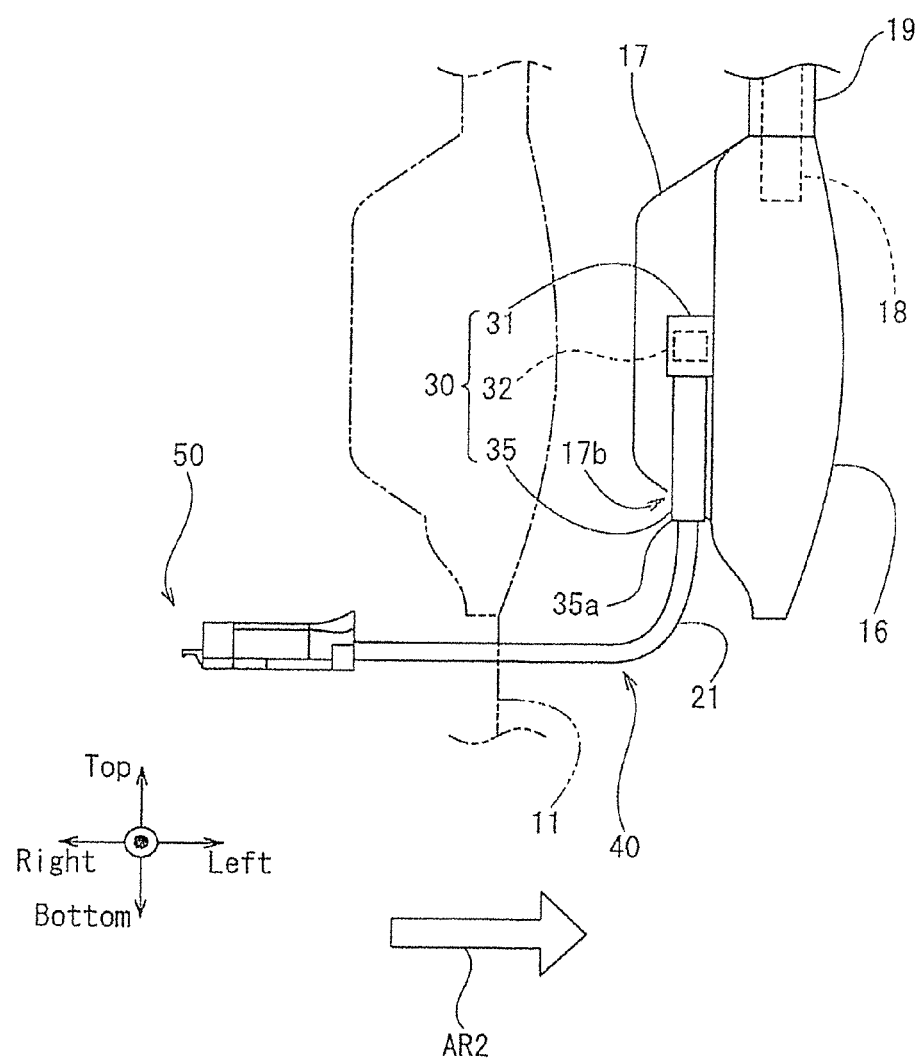
FIG. 5 is a front view showing the example of the power feeding wiring structure.

FIG. 4 is a side view showing an example of the configuration of a restricting portion 35. FIG. 5 is a front view showing an example of the power feeding wiring structure 20. As shown in FIGS. 2 to 5, the slide door side fixing device 30 mainly includes a base portion 31, a biasing portion 32 and the restricting portion 35.

The base portion 31 is a supporting body for pivotally supporting the restricting portion 35. As shown in FIGS. 2 and 3, the base portion 31 is fixed at a desired position in the slide door 14 with the wire protection tube 21 arranged in the base portion 31.

Although one end 21*a* of the wire protection tube 21 is arranged in the base portion 31 as shown in FIGS. 2 and 3, there is no limitation to this. For example, the wire protection tube 21 may be fixed to the base portion 31 with the one end 21*a* arranged outside the base portion 31. That is, the base portion 31 of the slide door side fixing device 30 fixes the one end 21*a* side (vicinity of the one end 21*a*) of the wire protection tube 21.

The restricting portion 35 is a tubular body which is pivotable relative to the base portion 31 and restricts a moving range of the wire protection tube 21 near the slide door 14. As shown in FIGS. 2 and 3, the restricting portion 35 is pivoted about a rotary shaft 30*a* relative to the base portion 31 with the wire protection tube 21 arranged in the restricting portion 35.

The biasing portion 32 is made of an elastic member such as a torsion coil spring. The biasing portion 32 rotates the restricting portion 35 in a direction of an arrow R1 (biasing direction) by accumulated elastic energy.

For example, when the base portion 31 moves in a direction (forward direction) opposite to an arrow AR1 together with the slide door 14 when the slide door 14 is closed, the wire protection tube 21 is pulled in a direction opposite to the arrow AR1 (solid line of FIG. 2). In this way, the restricting portion 35 receives a pulling force in a direction of the arrow AR1 (backward direction) from the wire protection tube 21. Thus, the restricting portion 35 is pivoted in a direction opposite to the arrow R1 and elastic energy corresponding to this tensile force is accumulated in the biasing portion 32.

On the other hand, when the base portion 31 moves in the direction of the arrow AR1 (backward direction) together with the slide door 14 when the slide door 14 is opened, the tensile force acting on the wire protection tube 21 is gradually reduced. In this way, the elastic energy accumulated in the biasing portion 32 is gradually released and the restricting portion 35 is pivoted in the direction of the arrow R1. When the wire protection tube 21 is deflected (chain double-dashed line of FIG. 2), the restricting portion 35 is pivoted to a chain double-dashed line position of FIG. 2.

Here, the shape of the restricting portion 35 is further studied. For example, if the planes of FIGS. 2 to 4 are defined as a plane normal to the rotary shaft 30*a*, a cross-section of the restricting portion 35 cut along the planes of FIGS. 2 to 4 (second plane) is arched.

Further, as shown in FIG. 4, if a reference plane RP (first plane) is defined by the position of a leading end 35*a* of the restricting portion 35 and the rotary shaft 30*a*, a center line CL along a length direction of the restricting portion 35 is arcuate and located in an area D1 at a front side in the direction of the arrow R1 with respect to the reference plane RP.

This causes the leading end 35*a* of the restricting portion 35 to project out from the slide door 14 through an opening 17*b* as shown in FIG. 5 when the slide door 14 is opened and closed.

Thus, when being opened and closed, the slide door 14 moves in a backward direction and a direction of an arrow AR2 (leftward direction) (see FIG. 5), whereby the interference of the inner panel 17 and the wire protection tube 21 can be prevented even if the wire protection tube 21 is pulled in forward and backward directions and lateral direction.

Further, when the slide door 14 is opened and closed, the power feeding wiring structure 20 can also prevent the interference of the restricting portion 35 with the electrical components mounted in the mounting area 17*a* (see FIGS. 2 and 3).

Note that the center line CL along the length direction of the restricting portion 35 may be, for example, a line segment connecting centers of gravity of cross-sections of the restricting portion 35 in a width direction.

<4. Advantage of Power Feeding Wiring Structure of Embodiment>

As described above, the power feeding wiring structure 20 of this embodiment can prevent the interference of the inner panel 17 and the wire protection tube 21 of the slide door 14 and the interference of the electrical components and the restricting portion 35 mounted in the mounting area 17*a*. Thus, the power feeding wiring structure 20 can realize satisfactory opening and closing movements of the slide door.

<5. Modifications>

Although the embodiment of the present invention has been described above, the present invention is not limited to the above embodiment and various modifications can be made.

(1) Although the wire protection tube 21 is a flexible and substantially cylindrical resin tube in the above embodiment, the shape of the wire protection tube 21 is not limited to this.

For example, a flexible and rectangular resin tube may be used as the wire protection tube 21.

(2) Although the cross-section of the restricting portion 35 cut along the plane normal to the rotary shaft 30*a* (planes of FIGS. 2 to 4) is arched in the above embodiment, the shape of the restricting portion 35 is not limited to this.

Figure 6:
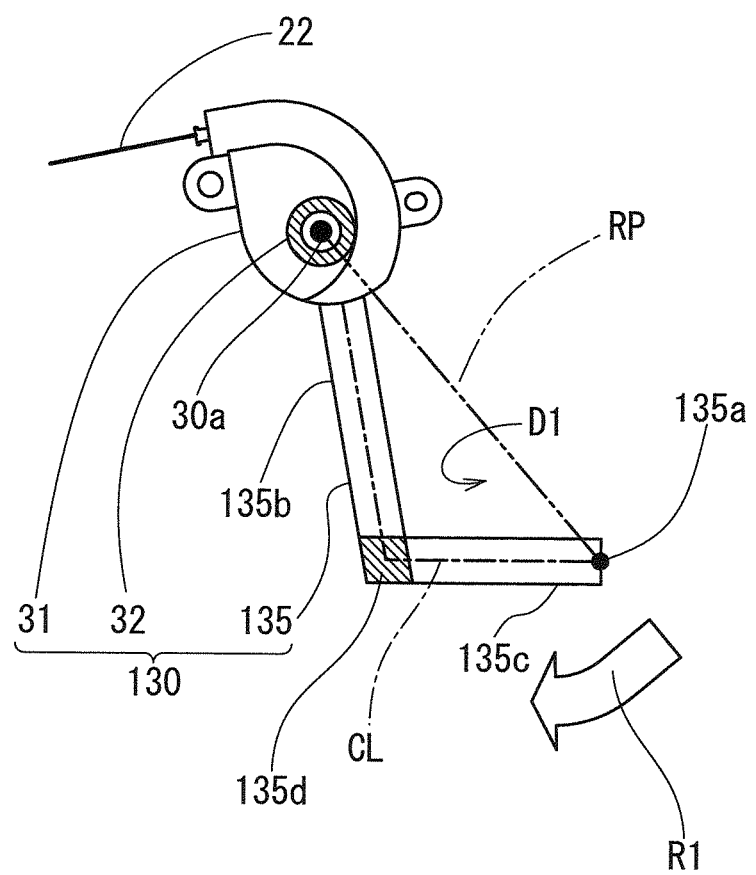
FIG. 6 is a side view showing another example of the configuration of the restricting portion.

FIG. 6 is a side view showing another example of the configuration of the restricting portion 35. As shown in FIG. 6, a restricting portion 135 mainly includes two tube portions 135*b*, 135*c* and a joint portion 135*d* for connecting the both tube portions 135*b*, 135*c* such that they communicate with each other.

In this case, the cross-section of the restricting portion 135 cut along a plane normal to the rotary shaft 30*a* (plane of FIG. 6) is L-shaped. Further, a center line CL along a length direction of the restricting portion 135 is in the shape of a broken line and located in an area Dl at a front side in a direction of an arrow R1 with respect to a reference plane RP.

In this way, a leading end 135*a* of the restricting portion 135 projects out from the slide door 14 similarly to the restricting portion 35 when the slide door 14 is opened and closed. Thus, the interference of the inner panel 17 and the wire protection tube 21 can be prevented when the slide door 14 is opened and closed.

Note that the restricting portion 135 may have a substantially cylindrical shape or a rectangular tube shape similarly to the restricting portion 35.

The invention claimed is:

1. A power feeding wiring structure, comprising:
(a) a protection tube having opposite first and second ends;
(b) a plurality of wires arranged in the protection tube;
(c) a slide door side fixing device provided on a slide door and adapted to fix the first end of the protection tube; and
(d) a vehicle body side fixing device provided on a vehicle body and adapted to fix the second end of the protection tube;
wherein:
the slide door side fixing device includes:
(c-1) a base portion fixed in the slide door with the protection tube arranged inside,
(c-2) a restricting portion for restricting a moving range of the protection tube near the slide door by being pivoted about a rotary shaft relative to the base portion with the protection tube arranged inside, and
(c-3) a biasing portion for rotating the restricting portion in a biasing direction by accumulated elastic energy; and a center line along a length direction of the restricting portion projects convexly in the biasing direction with respect to a first plane defined by the position of a leading end of the restricting portion and the rotary shaft, whereby the leading end of the restricting portion projects out from the slide door during all ranges of movement of the slide door as the slide door is opened and closed.

2. The power feeding wiring structure of claim 1, wherein, when a second plane is defined as a plane normal to the rotary shaft, a cross-section of the restricting portion cut by the second plane is arched to project convexly in the biasing direction.

3. The power feeding wiring structure of claim 2, wherein the restricting portion receives a tensile force from the protection tube by a closing movement of the slide door, whereby the tensile force causes the elastic energy to accumulate in the biasing portion.

4. The power feeding wiring structure of claim 1, wherein the center line of the restricting portion is arcuate.

5. The power feeding wiring structure of claim 4, wherein the restricting portion receives a tensile force from the protection tube by a closing movement of the slide door, whereby the tensile force causes the elastic energy to accumulate in the biasing portion.

6. The power feeding wiring structure of claim 1, wherein the restricting portion receives a tensile force from the protection tube by a closing movement of the slide door, whereby the tensile force causes the elastic energy to accumulate in the biasing portion.

7. The power feeding wiring structure of claim 1, wherein the slide door includes an outer panel and an inner panel, the leading end of the restricting portion projecting out from the inner panel of the slide door during all ranges of movement of the slide door as the slide door is opened and closed.

* * * * *